United States Patent

[11] 3,622,661

| [72] | Inventors | William James King<br>River Edge, N.J.;<br>Glendon Richard Miller, Wichita, Kans. |
|---|---|---|
| [21] | Appl. No. | 54,594 |
| [22] | Filed | July 13, 1970 |
| [45] | Patented | Nov. 23, 1971 |
| [73] | Assignee | Colgate-Palmolive Company<br>New York, N.Y.<br>Continuation-in-part of application Ser. No. 751,352, Aug. 9, 1968, now abandoned. This application July 13, 1970, Ser. No. 54,594 |

[54] ORAL PREPARATIONS
9 Claims, No Drawings

[52] U.S. Cl. .................................................... 424/50, 424/94

[51] Int. Cl. ..................................................... A61r 7/16

[50] Field of Search ............................................ 424/50

[56] References Cited
UNITED STATES PATENTS

| 3,194,738 | 7/1965 | Harrisson et al. .............. | 424/50 |
|---|---|---|---|
| 3,227,617 | 1/1966 | Manahan et al. .............. | 424/50 |

OTHER REFERENCES

Bowen, British Dental Journal, Vol. 124, No. 8, pages 347–349, 167/93

Fitzgerald et al., J. American Dental Association, Vol. 76, pages 301–304, 167/93

*Primary Examiner*—Richard L. Huff
*Attorneys*—Herbert S. Sylvester, Murray M. Grill, Norman Blumenkopf, Ronald S. Cornell, Thomas J. Corum, Richard N. Miller and Robert L. Stone ABSTRACT: Oral preparation containing dextranase and as binder, Irish moss or gum tragacanth.

ORAL PREPARATIONS

This application is a continuation-in-part of Ser. No. 751,352 filed Aug. 9, 1968 and now abandoned.

This invention relates to oral preparations. More particularly it relates to oral preparations characterized by cosmetic inseparability. The composition, according to certain aspects of the invention, contains dextranase and certain compatible binding or gelling agents.

Dextranase enzymes have been proposed to be desirable materials for promoting oral hygiene for instance by reducing the incidence of bacteria particularly on plaque which contains dextran. However, dextranase enzymes are not compatible with certain gumlike binding or gelling agents which have until now been commonly used in oral preparations. Thus, when the dextranase is incorporated in oral preparations such as dental creams or gels containing synthetic cellulose derivatives as binding agents, the dental cream or gel quickly loses its consistency as liquid ingredients separate from solid ingredients, thereby forming a cosmetically undesirable product.

It is an object of this invention to provide an oral preparation containing dextranase which is stable and of desirable consistency.

Other objects will be apparent from consideration of the following description.

In accordance with certain of its aspects, this invention relates to an oral preparation comprising aqueous liquid, dextranase and a binder material selected from the group consisting of Irish moss and gum tragacanth.

The oral preparations of this invention is typically a toothpaste, that is, a dental cream or gel. Such a cream or gel may be employed as a toothpaste or a mouth rinse. Generally the preparation also contains a polishing agent. If the cream or gel preparation is to be specifically used as a mouth rinse, the presence of a polishing agent is not required.

Dextranase enzymes are commonly produced by growing the organism *Penicillium funiculosum* in a dextran containing medium. The dextran is commonly a commercial grade obtained from *Leuconostoc mesenterioides*. This commercial grade of dextran contains about 95 percent $\alpha$-1, 6-glucoside linkages and about 5 percent $\alpha$-1, 3-glucoside linkages. The *Penicillium* organism produces the dextranase which particularly hydrolizes the 1, 6-linkages.

This dextranase may be prepared for use in an oral preparation in accordance with procedures which are described in the art. These include the procedure described by Bowen, "British Dental Journal." Vol. 124, No. 8, dated Apr. 16, 1968, pages 343–349. A further procedure is described in U.S. Pat. No. 2,742,399 to Tsuchiya et al. (Note also Tsuchiya et al. "Journal of Bacteriology," Vol. 64, page 513).

In the procedure of Bowen dextran may be prepared from noncariogenic streptococcal strains such as ATCC 10558, 903–1600, IIA2+3 or *Leuconostoc mesenterioides* and purified according to the method described by Wood et al., "Archives of Oral Biology," Vol. 11, 1066, pages 1039 et seq., except that *L. mesenterioides* is grown at 25° C.

Dextranase may be prepared from dextran by inoculating *Penicillium funiculosum* into flasks containing 250 ml. of a medium containing 0.5 percent yeast extract and 1 percent dextran. The flasks are incubated at 30° C. on a shaking incubator for 4 days. The culture is then centrifuged at 3,000 g. for 20 minutes and filtered through Whatman 42 filter paper. Dialysis in 16 mm. "Visking" tubing against deionized water and concentrating fifty-fold by dialysis against polyethylene glycol (molecular weight 20,000) follows. The dextranase produced in accordance with this procedure has a molecular weight of about 200,000–275,000. If desired, the dextranase may be further purified by fractionation with ammonium sulfate.

Additional procedures for preparing dextranase include that described in U.S. Pat. No. 2,742,399 to Tsuchiya et al.

In addition to the dextranase enzymes prepared in commercial dextran medium as described above dextranase enzymes containing higher proportions of $\alpha$-1,3-glucoside linkages may be prepared from dextrans of plaques, thereby producing enzymes which can effectively hydrolize the 1,3 linkages.

The amount of dextranase employed in the oral preparation of the invention is at least such amount as is effective in promoting oral hygiene. This amount is dependent upon activity of the dextranase which may typically range from about 400 to 8,000 units/mg. and therefore upon the mode of its preparation. A typically prepared dextranase enzyme material has an activity of 800 units/mg. 1 unit is the amount of enzyme which produces 1 mg. equivalent of isomaltose monohydrate in 1 hour at 40° C. at pH 5.1 on 2.5 percent dextran (Note Tsuchiya et al., "Journal of Bacteriology," Vol. 64, page 513).

While smaller amounts of dextranase may be used, a dextranase enzyme material such as that described above may be present in amounts of about 0.001–5 percent by weight of the oral preparation, preferably about 0.01–2 percent most preferably about 0.01 percent. The amounts refer to the amount of dextranase in the material. The material is generally in crude form.

The binding agent of the instant invention is Irish moss or gum tragacanth. The most preferred binder is Irish moss.

Certain synthetic binding agents and particularly certain synthetic cellulose derivatives, such as sodium carboxymethyl cellulose, sodium carboxymethyl hydroxyethyl cellulose and methyl cellulose, which have commonly been employed as binding agents in oral preparations, should be avoided since compositions containing such derivatives and dextranase are thin and then to separate into liquid and solid portions. Similarly, preparations containing certain gums other than gum tragacanth are thin and tend to separate. Gum karaya is an example of a gum which thins and separates in the presence of dextranase.

The binder material is typically employed in amount of up to about 10 percent by weight, preferably up to about 5 percent and most preferably about 0.2–1.5 percent of the oral preparation.

The desirable character of the oral preparation of this invention is attained by proportioning cosmetically acceptable and nontoxic aqueous liquid ingredients with solid ingredients such as the binding material and, particularly in the case of dental creams, polishing agent. In general, the liquids in the reparation will comprise chiefly water, glycerine, aqueous solutions of sorbitol, propylene glycol, polyethylene glycol 400, etc., including suitable mixtures thereof. It is advantageous usually to use a mixture of both water and humectant such as glycerine or sorbitol. The total liquid content will generally be about 20–75 percent by weight of the formulation.

Preparations of this invention form creamy or gel masses of desired consistency which are easily extrudable from a pressurized container or a collapsible, e.g., aluminum or lead tube.

Preferably the oral composition is a dental cream or gel and contains a suitable substantially water-insoluble polishing agent. There is a relatively large number of such materials known in the art. Representative materials include, for example, dicalcium phosphate, tricalcium phosphate, insoluble sodium metaphosphate, aluminum hydroxide, magnesium carbonate, calcium carbonate, calcium pyrophosphate, calcined aluminum silicate, calcium sulfate, bentonite, polymethyl methacrylate, etc., including suitable mixtures thereof. It is preferred to use the water-insoluble phosphate salts as the polishing agents and, more particularly, insoluble sodium metaphosphate and/or a calcium phosphate, such as dicalcium phosphate dihydrate. In general, these polishing agents will comprise a major proportion by weight of the solid ingredients. The polishing agent content is variable, but will generally be up to about 75 percent by weight of the total dental cream composition, typically about 20–75 percent.

The instant compositions normally have a pH between about 4 and 9 and preferably on the order of about 4–6. Suitably a buffering system may be employed to assure maintenance of a pH within the aforesaid range.

Organic surface-active agents used in the compositions of the present invention to achieve increased prophylactic action, assist in achieving thorough and complete dispersion of the instant compositions throughout the oral cavity, and render the instant compositions more cosmetically acceptable. The organic surface active material may be anionic; nonionic ampholytic or cationic in nature, and it is preferred to employ as the surface active agent a detersive material which imparts to the composition detersive and foaming properties. Suitably such detergents and water-soluble salts of higher fatty acid monoglyceride monosulfates, such as the sodium salt of the monosulfated monoglyceride of hydrogenated coconut oil fatty acids, higher alkyl sulfates, such as sodium lauryl sulfate, alkyl aryl sulfonates, such as sodium dodecyl benzene sulfonate, higher alkyl sulfoacetates, higher fatty acid ester of 1,2 dihydroxy propane sulfonates, and the substantially saturated higher aliphatic acyl amides of lower aliphatic amino carboxylic acid compounds, such as those having 12 to 16 carbons in the fatty acid, alkyl or acyl radicals, and the like. Examples of the last-mentioned amides are N-lauroyl sarcosine, and the sodium, potassium, and ethanolamine salts of N-lauroyl, N-myristoyl, or N-palmitoyl sarcosinates, which should be substantially free from soap or similar higher fatty acid material which tends to substantially reduce the effect of these compounds. The use of these sarcosinate compounds in dentifrice compositions of the present invention is particularly advantageous since these materials exhibit a prolonged and marked effect in the inhibition of acid in the oral cavity due to carbohydrates, in addition to exerting some reduction in the solubility of tooth enamel in acid solutions.

Other suitable surface active materials include nonionic agents, such as condensates of sorbitan monostearate with approximately 60 moles of ethylene oxide, condensates of ethylene oxide with propylene oxide condensates of propylene glycol ("Pluronics") and cationic surface active germicides and antibacterial compounds such as di-isobutylphenoxyethoxyethyl dimethyl benzyl ammonium chloride, benzyl dimethyl stearyl ammonium chloride, tertiary amines having one fatty alkyl group (of from 12 to 18 carbon atoms) and two (poly)oxyethylene groups attached to the nitrogen (typically containing a total of from about 2 to 50 ethenoxy groups per molecule) and salts thereof with acids, and compounds of the structure

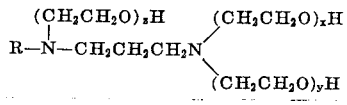

where R is a fatty alkyl group containing from about 12 to 18 carbon atoms, and $x$, $y$, and $z$ total 3 or higher, as well as salts thereof with mineral or organic acids.

It is preferred to use from about 0.05 to 5 percent by weight of the foregoing surface-active materials in the instant preparations.

Various other materials may be incorporated in the preparations of this invention. Examples thereof are coloring or whitening agents, preservatives, silicones, chlorophyll compounds, ammoniated materials, such as urea, diammonium phosphate and mixtures thereof, and other constituents. These adjuvants are incorporated in the instant compositions in amounts which do not substantially adversely affect the properties and characteristics suitably selected and used in proper amount depending upon the particular type of preparation involved.

Additionally, antibacterial agents may be desirably incorporated in the compositions of the invention. Such agents include:

$N^1$-(4-chlorobenzyl)-$N^5$-(2,4-dichlorobenzyl) biguanide;
p-chlorophenyl biguanide;
4-chlorobenzhydryl biguanide;
4-chlorobenzhydrylguanylurea;
N-3-lauroxypropyl-$N^5$-p-chlorobenzylbiguanide;
1,6-di-p-chlorophenylbiguanidohexane;
1-(lauryldimethylammonium)-8-(p-chlorobenzyldimethylammonium) octane dichloride;
5,6-dichloro-2-guanidinobenzimidazole;
$N^1$-p-chlorphenyl-$N^5$-laurylbiguanide;
5-amino-1,3-bis(2-ethylhexyl)-5-methylhexahydropyrimidine;

and their nontoxic acid addition salts. These agents may be employed in amounts ranging from 0.01 percent–5 percent and preferably 0.05 percent–1.0 percent.

Any suitable flavoring or sweetening sialagogue may be employed in formulating a flavor for the compositions of the present invention. Examples of suitable flavoring constituents include the flavoring oils, e.g., oils of spearmint, peppermint, wintergreen, sassafras, clove, sage, eucalyptus, marjoram, cinnamon, lemon and orange, as well as sodium methylsalicylate. Suitable sweetening agents include sucrose, lactose, maltose, sorbitol, sodium cyclamate and saccharine. Suitably, flavor and sweetening agent may together comprise from about 0.01 to 5 percent or more of the compositions of the instant invention.

The oral preparations of the invention may also desirably contain a fluorine-providing compound.

Examples of fluorine-providing compounds include sodium fluoride, stannous fluoride, potassium fluoride, potassium stannous fluoride ($SnF_2 \cdot KF$), sodium hexafluorostannate, stannous chlorofluoride, sodium fluorozirconate and sodium monofluorophosphate. These materials, which dissociate or release fluorine containing ions in water, suitably are present in an effective but nontoxic amount, usually within the range to provide about 0.01–1 percent by weight of fluorine, preferably about 0.1 percent, to the oral preparation. The preferred fluorine-providing compounds are stannous fluoride and sodium monofluorophosphate. Stannous fluoride is typically employed in amounts of about 0.04–4.1 percent by weight, preferably about 0.4 percent and sodium monofluorophosphate in amount of about 0.076–7.6 percent by weight, preferably about 0.76 percent.

An additional advantage of the instant invention is that preparations containing stannous compounds, such as stannous fluoride, potassium stannous fluoride and stannous chlorofluoride, retain desirable taste as well as texture in oral preparations containing dextranase and Irish moss or gum tragacanth. The prior art has taught that such stannous compounds caused a foul odor and poor texture in compositions containing binding agents which were not cellulose derivatives.

The following specific examples are further illustrative of the nature of the present invention but it is understood that the invention is not limited thereto. All parts and proportions in the examples are by weight unless otherwise indicated.

EXAMPLE I

The following dental cream is prepared and placed in a collapsible aluminum toothpaste tube:

| Component | Parts |
|---|---|
| Glycerine | 19.950 |
| Tetra Sodium Pyrophosphate | 0.250 |
| Sodium Saccharin | 0.200 |
| Sodium Benzoate | 0.500 |
| Irish Moss | 0.850 |
| Water (Deionized) | 19.977 |
| Calcium Carbonate | 5.000 |
| Dicalcium Phosphate Dihydrate | 46.750 |
| Sodium N-Lauroyl Sarcosinate (35%) | 5.714 |
| Flavor | 0.800 |
| Dextranase (activity 800 units/mg.) | 0.009 |

The composition retains its consistency and is easily extruded from the tube onto a toothbrush even several months after its preparation and tubing.

Similar dental creams are prepared in which gum tragacanth replaces the Irish moss.

When Irish moss is replaced with sodium carboxymethyl cellulose and sodium carboxymethyl hydroxyethyl cellulose, the preparation quickly losses its creamy consistency and becomes highly liquid in character as solids separate from liquids.

EXAMPLE II

The following oral gel is prepared and placed in a dentifrice tube:

| Component | Parts |
| --- | --- |
| Glycerine | 10.000 |
| Sorbitol | 74.491 |
| Irish Moss | 2.000 |
| Sodium Benzoate | 0.500 |
| Sodium Saccharin | 0.200 |
| Sodium Lauryl Sulfate | 1.500 |
| Ethanol | 10.000 |
| Flavor | 1.300 |
| Dextranase (activity 800 units/mg.) | 0.009 |

The composition retains its consistency and is easily extruded from the tube onto a toothbrush long after its preparation and tubing.

EXAMPLE III

The following dentifrice is prepared and placed under nitrogen pressure in a pressurized container:

| Component | Parts |
| --- | --- |
| Glycerine | 27.350 |
| Irish Moss | 0.600 |
| Sodium Benzoate | 0.500 |
| Sodium Saccharin | 0.200 |
| Water | 13.827 |
| Calcium Carbonate | 5.000 |
| Dicalcium Phosphate | 46.000 |
| Sodium N-Lauroyl Sarcosinate (35%) | 5.714 |
| Flavor | 0.800 |
| Dextranase (activity 800 units/mg.) | 0.009 |

The dentifrice retains its consistency and is extruded from the container without difficulty long after being placed in the container.

Example IV

The ability of compositions containing dextranase and various binding materials to retain consistency is confirmed by viscosity measurements at 20° C. on a Brookfield Viscometer, Model LVT, No. 3, spindle at 30 r.p.m.

tives and dextranase or gums such as gum karaya and dextranase quickly come to possess an undesirable viscosity and become highly liquid in character.

EXAMPLE V

The following dental creams are prepared and placed in a collapsible aluminum toothpaste tube:

| Component | Parts | Parts |
| --- | --- | --- |
| Glycerine | 27.100 | 11.160 |
| Irish Moss | 1.400 | 1.100 |
| Sodium Benzoate | 0.150 | 0.500 |
| Sodium Saccharin | 0.200 | 0.200 |
| Sorbitol | — | 20.000 |
| Water | 22.041 | 11.407 |
| Sodium N-Lauroyl Sarcosinate | — | 5.714 |
| Sodium Lauryl Sulfate | 1.500 | — |
| Insoluble Sodium Metaphosphate (35%) | 40.600 | 41.850 |
| Hydrated Alumina | — | 1.000 |
| Dicalcium Phosphate | 5.000 | 5.000 |
| Titanium Dioxide | 0.400 | 0.400 |
| Sodium Monofluorophosphate | — | 0.760 |
| Stannous Fluoride | 0.400 | — |
| Flavor | 1.200 | 0.900 |
| Dextranase (activity 800 units/mg.) | 0.009 | 0.009 |

The compositions are effective in promoting oral hygiene and also retain their consistency and desirable odor and texture long after their preparation and tubing.

It will be apparent that various modifications may be made in the examples which fall within the scope of the invention.

1. In an oral preparation comprising about 20–75 percent by weight aqueous liquid and about 0.001–5 percent by weight dextranase, the improvement which comprises employing about 0.2–10 percent by weight of a binder selected from the group consisting of Irish moss and gum tragacanth.

2. The oral preparation claimed in claim 1 wherein said binder is Irish moss.

3. The oral preparation of claim 1 wherein said preparation additionally contains about 20–75 percent by weight of a water-insoluble polishing agent.

4. The oral preparation of claim 3 wherein said binder is Irish moss.

5. The oral preparation claimed in claim 3 wherein said polishing agent includes phosphate salt.

6. The oral preparation claimed in claim 1 wherein said polishing additionally contains a fluorine-providing compound in amount to provide about 0.01 percent –1 percent by weight of fluorine.

7. The oral preparation claimed in claim 6 wherein said fluorine-providing compound is stannous fluoride.

8. The oral preparation claimed in claim 6 wherein said

| Composition | Viscosity (centipoises) | | | |
| --- | --- | --- | --- | --- |
| | 0-time | 1 day | 5 days | 7 days |
| 1% Irish moss | 1,300 | | | 1,500 |
| 1% Irish moss and 0.01% dextranase | 1,300 | | | 1,500 |
| 2% sodium carboxymethyl cellulose | 440 | | 1,700 | |
| 2% sodium carboxymethyl cellulose and 0.01% dextranase | 420 | | 40 | |
| 1% sodium hydroxyethyl carboxymethyl cellulose | 1,180 | 960 | | |
| 1% sodium hydroxyethyl carboxymethyl cellulose and 0.01% dextranase | 680 | 0 | | |
| 1% methyl cellulose | 1,080 | 980 | | |
| 1% methyl cellulose and 0.01% dextranase | 1,160 | 240 | | |
| 2.5% gum karaya | 1,480 | 1,300 | | |
| 2.5% gum karaya and 0.01% dextranase | 1,520 | 920 | | |
| 2% Gum tragacanth | 3,480 | 3,460 | | |
| 2% Gum tragacanth and 0.01% dextranase | 3,540 | 3,480 | | |

The dextranase employed has an activity of 800 units/mg.

Thus, it is apparent that preparations containing Irish moss or gum tragacanth and dextranase retain desirable consistency while preparations which contain synthetic cellulose derivatives fluorine-providing compound is sodium monofluorophosphate.

9. The oral preparation claimed in claim 6 wherein said binder is Irish moss.